(12) United States Patent
Krishnakumar et al.

(10) Patent No.: US 6,611,529 B1
(45) Date of Patent: Aug. 26, 2003

(54) PRIORITY ACCESS FOR REAL-TIME TRAFFIC IN CONTENTION-BASED NETWORKS

(75) Inventors: Anjur Sundaresan Krishnakumar, Rocky Hill, NJ (US); Joao Luis Sobrinho, Lisbon (PT); John Andrew Trotter, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/261,693

(22) Filed: Mar. 3, 1999

(51) Int. Cl.[7] .......................... H04J 3/16; H04L 12/413
(52) U.S. Cl. ....................... 370/437; 370/447
(58) Field of Search ................ 370/276, 252, 370/282, 351, 389, 400–405, 406–7, 431, 433, 437, 442, 443–4, 445–8

(56) References Cited

U.S. PATENT DOCUMENTS

| | | | |
|---|---|---|---|
| 5,237,695 A | | 8/1993 | Skokan et al. ............... 395/725 |
| 5,293,571 A | * | 3/1994 | Matsuda et al. ............ 370/445 |
| 5,351,241 A | | 9/1994 | Yehanaton ................... 370/447 |
| 5,453,987 A | | 9/1995 | Tran ........................... 370/447 |
| 5,517,501 A | | 5/1996 | Jacquet et al. .............. 370/447 |
| 5,519,834 A | | 5/1996 | Kamerman et al. .... 395/200.06 |
| 5,579,486 A | | 11/1996 | Oprescu et al. ............. 395/200 |
| 5,663,960 A | | 9/1997 | Le Guen et al. ............ 370/438 |
| 5,740,174 A | | 4/1998 | Somer ........................ 370/402 |
| 5,768,350 A | | 6/1998 | Venkatakrishnan ......... 370/418 |
| 5,936,962 A | * | 8/1999 | Haddock et al. ............ 370/446 |
| 5,963,560 A | * | 10/1999 | Kalkunte ..................... 370/448 |
| 5,982,779 A | * | 11/1999 | Krishnakumar et al. .... 370/447 |
| 6,014,087 A | * | 1/2000 | Krishnakumar et al. . 340/825.5 |
| 6,272,147 B1 | * | 8/2001 | Spratt et al. ................. 370/447 |
| 6,359,899 B1 | * | 3/2002 | Krishnakumar et al. .... 370/444 |

OTHER PUBLICATIONS

"Multiple Priority CSMA–type Multichannel Local Area Network," by Jia–Wei Liao et al., INFOCOM '97, Sixteenth Annual Joint Conference of the IEEE Computer and Communications Societies (5/97).
I. Chlamtac, "An Ethernet Compatible Protocol for Real–Time Voice/Data Integration," *Computer Networks and ISDN Systems* 10 (1985) 81–96, Elsevier Science Publishers B.V. (North Holland).
O. Sharon et al., A CSMA/CD Compatible MAC for real–time Transmissions based on varying Collision Intervals, IEEE, pp. 1265–1672 (1998). U.S. application Ser. No. 08/792,327 filed Mar. 8, 1996 entitled "A Wireless Lan Distributed Access Procedures Providing Priority For Voice Transmissions."
U.S. application Ser. No. 08/923,301 filed Sep. 4, 1997 entitled "Priority Access For Real–Time Traffic In Contention–Based Networks."
U.S. application Ser. No. 08/923,302 filed Sep. 4, 1997 entitled "Priority Access For Real–Time Traffic In Contention–Based Networks."

* cited by examiner

*Primary Examiner*—David Vincent (57) ABSTRACT

In a contention-based network, a station, whose transmission is colliding with the transmission of another station and which heretofore would have transmitted a data packet immediately following its colliding transmission—as, for example, in a blackburst contention—suspends transmission immediately upon termination of the collision and, if necessary, at a particular point(s) in time during the collision. The station recommences transmission after a predetermined non-zero duration of time, or "time notch", during which the medium is idle. In particular, a station that has won a blackburst contention separates its blackburst signal from its subsequent data transmission by a certain amount of time during which the medium is idle. Moreover, a station participating in a blackburst contention may cause the occurrence of a time notch at particular points in time during the contention in order that its access priority vis-a-vis other stations be determined.

34 Claims, 4 Drawing Sheets

PRIORITY ACCESS FOR REAL-TIME TRAFFIC IN CONTENTION-BASED NETWORKS

FIELD OF THE INVENTION

The invention relates to a contention scheme for access to a transmission medium.

BACKGROUND OF THE INVENTION

Access to a shared medium in local area networks such as Ethernet® networks is typically realized by a Carrier Sense Multiple Access/Collision Detection (CSMA/CD) protocol. This protocol provides for a station on the network to wait for the medium to become idle before transmitting its data packet. If more than one station transmits at the same time, a collision occurs. Upon detecting a collision, the transmitting stations abort their transmissions and transmit so-called jam signals, each jam signal being of equal duration. After transmitting the jam signals, the stations enter a so-called backoff mode in which each station waits for a randomly chosen time interval before attempting retransmission. Because the waiting time is randomly chosen, the probability of a second collision is reduced.

Such contention-based networks were originally developed primarily for non-real-time applications such as data. More recently, they have been employed to support real-time applications such as voice and video. However, using contention-based networks to carry real-time traffic may be problematic because of such networks' inability to guarantee a maximum, or bounded, delay service and thus their inability to guarantee a desired level of service quality for real-time applications. As a result, techniques have been developed that give priority to applications with real-time constraints.

One such technique is taught in our co-pending U.S. patent applications (Ser. No. 08/792,327 now U.S. Pat. No. 6,014,037 filed Jan. 30, 1997 and entitled "A Wireless Lan Distributed Access Procedure Providing Priority For Voice Transmissions"; Ser. No. 08/923,301 now U.S. Pat. No. 6,359,899 filed Sep. 04, 1997 and entitled "Priority Access For Real-Time Traffic In Contention-Based Networks"; Ser. No. 08/923,302 now U.S. Pat. No. 5,982,779 filed Sep. 04, 1997 and entitled "Priority Access For Real-Time Traffic In Contention-Based Networks"). Specifically, upon transmitting a packet and detecting a collision with existing network traffic, a real-time station contends for access to the medium by transmitting a so-called blackburst signal for a predetermined duration of time. That predetermined duration of time is determined as a function of the level of access priority that it is desired for that station to have vis-à-vis other real-time stations. For example, it may be a function of the amount of time that the real-time station had to wait for the transmission medium to become idle after the data packet became ready for transmission. Thus, the real-time station that was waiting the longest has the longest blackburst signal.

This being so, the real-time station that was waiting the longest is given priority in transmitting its data packet. Having the longest blackburst, the real-time station that was waiting the longest finds that at some point during its blackburst transmission its blackburst is the only signal being transmitted on the medium—meaning that other real-time stations whose waits were shorter completed their blackburst transmissions. The real-time station thus "wins" the contention and accesses the medium to transmit a data packet thereon following the termination of the blackburst.

On the other hand, a real-time station "loses" the contention if that station finds that, upon termination of its blackburst, another signal is being transmitted on the medium—meaning that another real-time station whose wait was longer is still transmitting its blackburst. The losing real-time station then waits for the transmission medium to once again become idle. Upon perceiving the medium to be idle, the real-time station transmits a packet. If yet another collision occurs, the real-time station again transmits its blackburst. However, in this instance the duration of the blackburst will be longer than before as a result of the increase in the amount of time that the real-time station had to wait to access the transmission medium. Assuming no other real-time station had to wait longer, the real-time station's blackburst is longer than other blackburst signals. Thus the real-time station finds the medium to be idle following its blackburst transmission and transmits its data packet. In this way, a station that had previously lost the contention does ultimately gain access to the medium.

In the embodiments disclosed in the cited patent applications, the transmission network is configured as a bus. However, often the network is a so-called star network in which one or more stations are connected to a "hub". A hub is a device that serves as the functional equivalent of a bus in that it communicates the signals transmitted by one station to at least one other station. In addition, if a collision occurs, the hub propagates the collision event throughout the network by transmitting a jam signal. The hub also enforces certain rules to guard against errant station behavior. In particular, the hub keeps track of the values of a number of parameters for every station, one of which being the length of each collision, $L_{ec}$. If, for any station, the value of this parameter reaches its maximum value set by the hub, the hub "shuts down" the offending station, or "isolates" it from the network, i.e., the hub does not communicate the data transmitted by that station to any other station(s).

The above-described hub actions create problems for a station that has won a blackburst contention, referred to hereinbelow as a "winning station.". First, the contention itself, independent of its duration, causes the hub to transmit a jam signal whereupon any data packet that the winning station transmits immediately upon winning the contention is not communicated to any other station(s). That is, another station receives the jam signal rather than the transmitted data packet. In addition, the winning station may have transmitted its blackburst signal for a significant period of time during which it collided with the blackburst signals of other real-time stations. As a result, that station may have its value for the $L_{ec}$ parameter exceed the maximum allowed by the hub and thus would be shut down by the hub. However, the station, having won the contention and unaware that it has been shut down, proceeds to transmit its packet, which, unfortunately, is never received by another station. Finally, if, for example, two stations that are participating in a blackburst contention both have their values for the $L_{ec}$ parameter exceed the maximum, both stations are shut down by the hub before either station can determine whether it has priority over the other station. As a result, when the stations are reinstated into the network, both stations will commence transmission and another contention will occur.

SUMMARY OF THE INVENTION

According to the principles of the invention, a station whose transmission is colliding with the transmission of another station and which heretofore would have transmitted a data packet immediately following its colliding transmission—as, for example, in a blackburst contention as described above—suspends transmission immediately upon termination of the collision and, if necessary, at a particular point(s) in time during the collision. The station recommences transmission after a predetermined non-zero duration of time, or "time notch", during which the medium is idle. More specifically, that station suspends its transmission when the collision terminates and at other points in time as may be necessary to prevent the duration of its colliding transmission from causing that station's value of the $L_{ec}$ parameter to exceed the maximum allowed by the hub. To this end, a station may illustratively time the duration of the collision and insert time notches as appropriate. An alternative approach that is easier to implement for a station involved in a blackburst contention is for that station to cause the occurrence of a time notch after the transmission of every so-called black slot that comprises that station's blackburst signal.

The suspension of a station's transmission upon termination of a collision causes the hub to no longer transmit the jam signal and provides the opportunity for a subsequent transmission by that station to be received by another station(s). The suspension of a station's transmission at points in time during a collision causes the hub to reset the value of the station's $L_{ec}$ parameter to an initial value. As a result, if a station has been shut down by the hub because at least a portion of its transmission has collided with another station's transmission for a longer duration than the maximum allowed by the hub, the station is caused to be reinstated into the network. Thus the hub communicates the station's subsequent transmission in the normal way.

If nothing more were done, another real-time or non-real-time station that became ready to transmit while a contention was ongoing would take steps to do so upon detecting that the medium was idle during a time notch and, in particular, during the time notch that was provided by a station upon winning the blackburst contention. The competing station's transmission would then collide with the winning station's transmission. This collision would cause the hub to not communicate the winning station's transmission to other station(s) and possibly to shut down the winning station.

This may not always be a problem because real-time stations operating under the blackburst scheme are preferably provided with filters recommended under Ethernet protocol that cause them to regard the medium as idle only if the medium is idle for a predetermined filter time interval. In preferred embodiments, the duration of the time notch is not greater than that filter time interval. As a result, a station having such a filter ignores the time notch and does not regard the medium as ever having been idle. This being so, the competing station does not commence a transmission, and no further collisions occur.

However, having such a filter is not mandatory for non-real-time stations and thus there remains the possibility of a collision between the winning station and a non-real-time station. This problem is solved in accordance with an aspect of the present invention by providing for an additional time notch if the winning station detects such a collision with a non-real-time station. Upon detecting that collision and transmitting its jam signal, the non-real-time station must wait a certain amount of time, referred to herein as "setup time", before it can once again transmit. Advantageously, to lessen the likelihood of even further collisions resulting from the occurrence of the additional time notch, the duration of the additional time notch is preferably not greater than the setup time.

DETAILED DESCRIPTION

Figure 1:
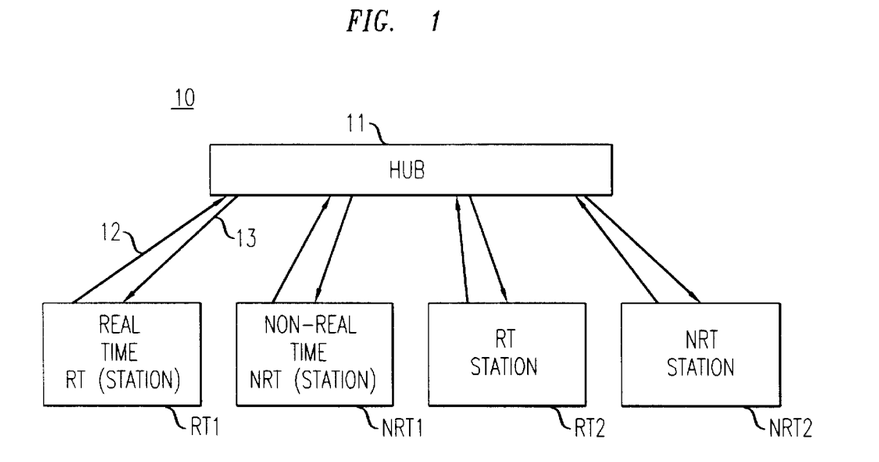
FIG. 1 shows a contention-based network in which the invention is illustratively embodied.

FIG. 1 shows a contention-based network 10—illustratively an Ethernet® local area network—in which the present invention is implemented. Network 10 employs the so-called star configuration and includes hub 11 to which are connected four communications stations. Although the relevant principles of Ethernet operation generally, and of the invention specifically, are illustrated herein in the context of a network supporting those four stations, a typical Ethernet or other network in which the invention may be utilized may include many more stations, up to the maximum allowed by the network specification itself. Furthermore, although the present invention is illustrated herein in terms of the communications stations being connected to the hub as in, for example, a wired environment, it should be understood that the invention is more broadly applicable to any network in which the hub may support the transmissions of the communications stations including, but not limited to, wireless environments.

Hub 11 is a device which not only serves as the functional equivalent of a bus by communicating all of the signals transmitted by one station to at least one other station but also performs some level of network management (described more fully hereinbelow), as well as certain carrier sensing and repeating functions. The hub has at least two connections to each station: a connection 12 for receiving data from the station, and a connection 13 for transmitting data to the station.

The stations connected to hub 11 comprise non-real-time stations NRT1 and NRT2 which generate non-real-time signals such as file transfer or other data-type signals and follow the rules of the Ethernet protocol strictly. The stations connected to hub 11 also include real-time stations RT1 and RT2. These stations likewise can generate non-real-time signals, and when they do, they likewise strictly follow the Ethernet protocol rules. However, stations RT1 and RT2 are also capable of generating real-time signals, such as voice and video signals, and when they do, they follow a modified version of the Ethernet protocol rules. As described in detail in our above-cited co-pending application Ser. No. 08/792, 327, these modified protocol rules ensure that real-time stations such as RT1 and RT2 get priority access to hub 11 relative to non-real-time stations such as NRT1 and NRT2.

Figure 2:
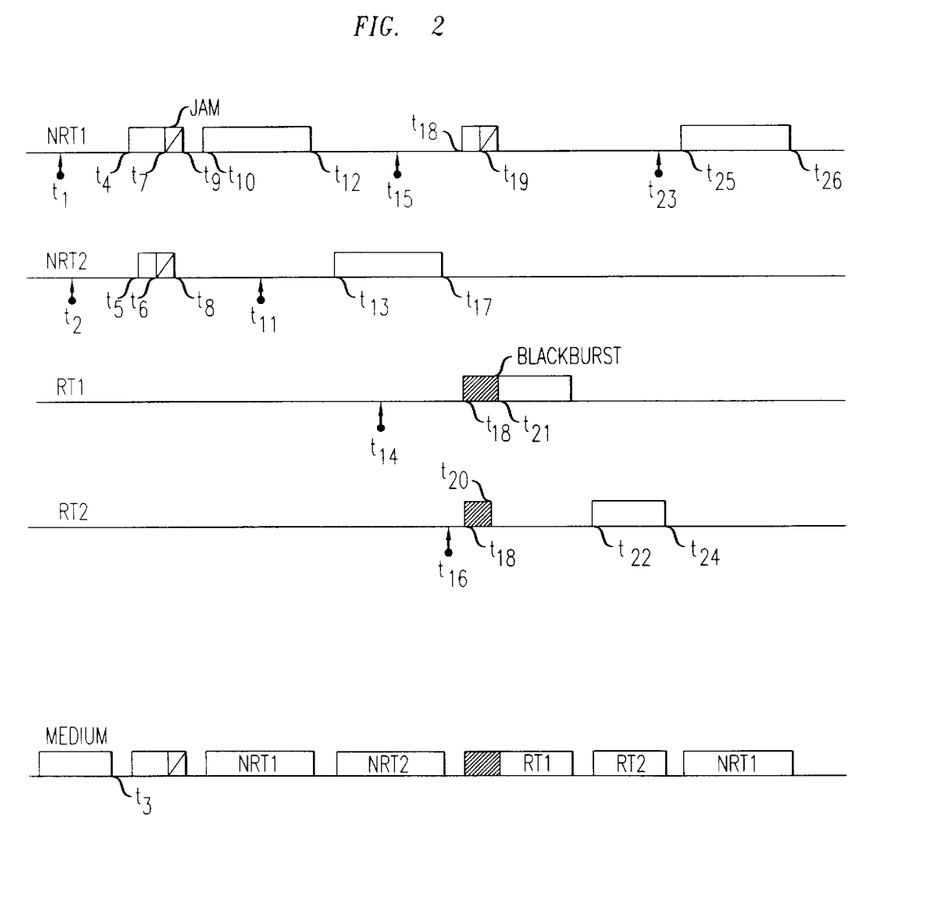
FIG. 2 shows an illustrative set of signals applied to the transmission medium of the network of FIG. 1 and is helpful in explaining the blackburst protocol.

FIG. 2 (not drawn to scale) shows an illustrative set of signals applied to the medium by the various stations as well as the overall composite signal appearing on the medium. Time is measured in units of bit-time, one bit-time being the time it takes to transmit a bit at whatever predetermined speed is provided for by the network (e.g., 10 Mb/sec or 100 Mb/sec).

It is assumed that non-real-time stations NRT1 and NRT2 become ready to transmit packets at times $t_1$ and $t_2$, respectively. However, as can be seen from the composite signal on medium, some other station is currently transmitting and hence non-real-time stations NRT1 and NRT2 simply wait.

The existing transmission terminates at time $t_3$ and it is presumed that non-real-time station NRT1, because of its physical location on the medium, is the first to observe that the medium has become idle. Following conventional Ethernet protocol, non-real-time station NRT1 waits a prescribed interframe time interval $t_{ifs}$ bit-times. Having waited $t_{ifs}$ bit-times after detecting the end of the prior transmission, non-real-time station NRT1 begins transmitting a conventional Ethernet packet at time $t_4$. It is assumed that non-real-time station NRT2 detects the end of the prior transmission sometime after non-real-time station NRT1 does and, after waiting $t_{ifs}$ bit-times, non-real-time station NRT2 begins transmitting at time $t_5$. (Unless stated to the contrary, it will hereinafter be assumed that a station waits for $t_{ifs}$ bit-times after perceiving the medium to be idle before it begins transmitting—even if that fact is not stated explicitly.)

Non-real-time stations NRT1 and NRT2 observe at times $t_7$ and $t_6$, respectively, that their transmissions are colliding. Upon observing the collision, each station transmits a conventional Ethernet jam signal of fixed duration, the jam signal being of such a nature that any one or more stations can be transmitting it and yet each will recognize the jam signal as being such. Thus all stations are alerted to the fact that a collision has occurred.

The jam signals transmitted by non-real-time stations NRT1 and NRT2, which are of the same duration, terminate at times $t_9$ and $t_8$, respectively. At that point, each station enters a so-called backoff mode in which each waits for a randomly chosen interval pursuant to conventional Ethernet protocol. The randomness makes it likely that these two stations will not collide again upon their respective subsequent attempts to access the medium. NRT1 exits the backoff mode at time $t_{10}$ and, finding the medium idle, transmits its packet. It completes its packet transmission at time $t_{12}$.

In the meantime, station NRT2 exits the backoff mode at time $t_{11}$, and becomes ready to transmit. Observing that the medium is busy, it waits until the medium becomes idle and ultimately, at time $t_{13}$, gains access to the medium and completes its packet transmission at time $t_{17}$.

While non-real-time station NRT2 was transmitting, real-time station RT1, non-real-time station NRT1 and real-time station RT2 all became ready to transmit, at times $t_{14}$, $t_{15}$ and $t_{16}$, respectively. It may be noted that even though it is desired to give some measure of priority to real-time transmissions, network 10 does not implement a preemptive approach. Thus ongoing transmissions are not interrupted. Rather both real-time and non-real-time stations always wait until the medium becomes idle. Time $t_{17}$ is indicated as being the point in time that all three stations perceive the medium to have become idle. (In order to simplify the discussion, the actual differences, due to propagation delay, in the times at which stations perceive the medium to be idle will hereinafter be ignored.) All three of those stations begin transmission at time $t_{18}$ which is $t_{ifs}$ bit-times after time $t_{17}$. Upon observing, sometime after time $t_{18}$, that a collision has occurred, non-real-time station NRT1 transmits a jam signal and enters the backoff mode at time $t_{19}$.

However, real-time stations RT1 and RT2, having also detected the collision, proceed to transmit a so-called blackburst signal. The contents of the blackburst signal can be any desired signal as long as it does not match to any predefined signal defined by the Ethernet protocol. The duration of the blackburst signal that a real-time station is prepared to generate is a function of the level of access priority that it is desired for that station to have vis-a-vis other real-time stations. Preferably, the duration of a station's blackburst signal is directly proportional to the length of time between the time the station becomes ready to transmit (e.g., when a signal to be transmitted is received by that station or when the station is scheduled to transmit) and the subsequent initiation of the transmission of that signal—in the case of real-time stations RT1 and RT2 that being since times $t_{14}$ and $t_{16}$, respectively.

Figure 3:
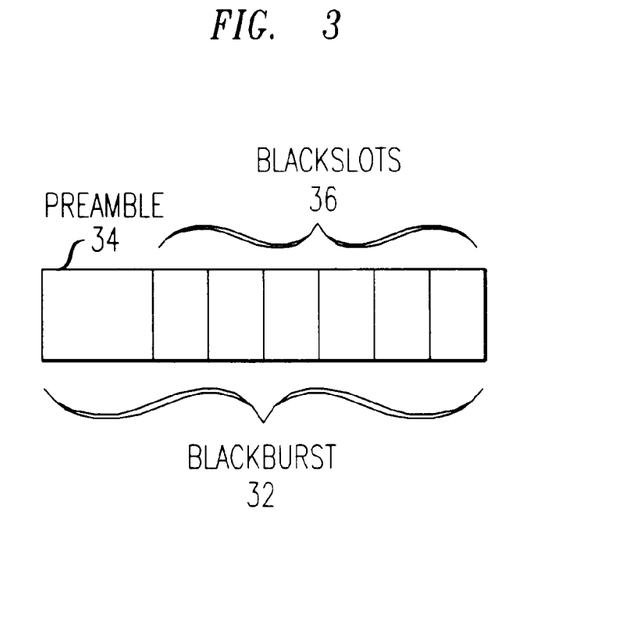
FIG. 3 shows the format of a blackburst signal used by real-time stations of the network of FIG. 1.

Specifically, as shown in FIG. 3 (not drawn to scale), blackburst signal 32, as with any transmission by a real-time station, illustratively starts with preamble 34, having a duration as described below. Blackburst signal 32 further includes an integral number of so-called "black slots" 36, each of duration $\geq 2\tau$, which is the round-trip propagation delay on the medium. The number of black slots that a station should be prepared to send is $d/t_{inter}$, rounded down to the next higher integer value, where d is the time that the station has been waiting and $t_{inter}$ is at most a time given by the length of data packet that will be transmitted upon gaining access to medium 11.

Each station transmitting the blackburst signal monitors the medium, and upon perceiving that it is the only station transmitting, aborts its blackburst transmission and begins transmission of its packet. Thus a station may actually transmit fewer black slots than it was prepared to transmit at the time that it initiated its blackburst transmission.

Referring back to FIG. 2, since real-time station RT1 was waiting longer, its blackburst interval is longer than that of RT2. Hence a point in time will be reached at which only RT1 is transmitting a blackburst signal. In particular, real-time station RT2's blackburst transmission ended at time $t_{20}$, while real-time station RT2's blackburst transmission continued beyond that point. Upon observing, at time $t_{21}$, that it alone is transmitting, real-time station RT1 aborts its blackburst transmission and begins transmitting its packet.

Meanwhile, real-time station RT2, upon perceiving that real-time station RT1's blackburst transmission was longer than its own, ceases transmission and enters a waiting mode.

The overall effect of having the real-time stations transmit a fixed length preamble 34 as part of the blackburst signal is to ensure that all non-real-time stations would have ceased transmission and gone into a backoff mode. To this end, the duration of preamble 34 is equal to the sum of (a) the aforementioned round-trip propagation delay on the medium, $2\tau$, and (b) the duration of the conventional Ethernet jam signal. Priority will thus have been secured for real-time transmissions without suffering the disruptive effects of a pre-emptive approach. Moreover, as among the real-time stations, the use of the blackburst mechanism ensures that when the duration of the blackburst signal is proportional to the length of time each station has been waiting since it became ready to transmit, the real-time station that was the first to become ready to transmit will "win" the blackburst contention, i.e., be the first to obtain access to the medium.

After real-time station RT1 has completed its transmission, real-time station RT2 gains access to the medium without further delay or collisions inasmuch as no other station is ready to transmit. At time $t_{22}$, real-time station RT2 starts the transmission of its packet, which continues to completion at time $t_{24}$. Meantime, at time $t_{23}$, non-real-time station NRT1 exits the backoff mode and becomes ready to transmit. By then real-time station RT2 is transmitting its packet. Non-real-time station NRT1 waits until real-time station RT2 is finished and then begins its transmission at time $t_{25}$, completing at time $t_{26}$.

While the backoff mode and blackburst contention protocol described above provide for the service of both real-time and non-real-time stations, there are other mechanisms that provide for stability and monitoring within the network. For example, hub 11 provides some level of network management. In particular, upon the occurrence of a collision, the hub propagates the collision event throughout the network by transmitting a jam signal. The hub also enforces certain rules to guard against station errant behavior.

Specifically, the hub keeps track of the values of a number of parameters for each station. If, for any station, the value of a parameter reaches or exceeds a maximum value set by the hub, the hub shuts down the offending station, or isolates it from the network. That is, the hub does not communicate signals transmitted by that station to any other station(s). The premise underlying the isolation of the offending station is that the fact that a station reached or exceeded a maximum value of a parameter is indicative of some anomalous condition which is serious enough to warrant the removal, in effect, of the station from the network. If that condition is merely transient, the hub resets the offending station's value of the parameter to an initial value and reinstates the offending station into the network when that condition no longer exists.

One of the parameters that the hub maintains for a station is the length of each collision parameter, or the $L_{ec}$ parameter. The value of this parameter is updated as the station continues with its colliding transmission. If, and at the point at which, the length of the colliding transmission reaches or exceeds the maximum length allowed by the hub, the hub shuts down the station. The station's value of the $L_{ec}$ parameter is reset upon the station terminating its transmission.

The above-described hub actions may pose problems for a station involved in a blackburst contention and in particular for the station that has won a blackburst contention—i.e., a "winning" station. First, the contention itself, independent of its duration, causes the hub to transmit a jam signal whereupon any data packet that the winning station transmits immediately upon winning the contention is not communicated to any other station(s). That is, another station receives the jam signal rather than receiving the transmitted data packet. In addition, the duration of the collision between the winning station's blackburst signal and the blackburst signal of another station may exceed the maximum value of the $L_{ec}$ parameter allowed by the hub. As a result, the winning station is shut off by the hub. However, unaware that it is shut off, the winning station, immediately after transmitting its blackburst signal, proceeds to transmit its data packet. Unfortunately, since the station is shut off by the hub, the packet is not received by any other station. Moreover, if two stations that are participating in a blackburst contention both have their values for the $L_{ec}$ parameter exceed the maximum, both stations are shut down by the hub before either station can determine whether it has priority over the other station. As a result, when the stations are reinstated into the network, both stations commence transmission and another contention occurs.

In accordance with the present invention, these problems are addressed by causing a station whose transmission is colliding with the transmission of another station and which wheretofore would have transmitted a data packet immediately following its colliding transmission—as, for example, in a blackburst contention as described above—to suspend transmission immediately upon termination of the collision and at other point(s) in time as may be necessary during the collision. The station recommences transmission after a predetermined non-zero duration of time, or "time notch", during which the medium is idle. The suspension of transmission at particular point(s) in time a) prevents the station from violating a hub rule and thus from being shut down, and b) brings the hub out of an error state to a collision-free state. More specifically, the station suspends its transmission when the collision terminates and, if necessary, at those points in time to prevent the duration of its colliding transmission from causing that station's value of the $L_{ec}$ parameter to exceed the maximum allowed by the hub.

To this end, a station that is participating in a collision—in particular, a blackburst contention—may illustratively time the duration of the collision and provide for time notches as appropriate. Thus, for example, by preventing that station from being shut down by the hub due to its value of the $L_{ec}$ parameter, the access priority of that station vis-a-vis other stations may be determined. Since a blackburst signal includes an integral number of black slots and since the duration of a black slot is typically less than the maximum value of the $L_{ec}$ parameter allowed by the hub, an alternative approach that is easier to implement is for that station to cause the occurrence of a time notch after the transmission of every black slot that comprises that station's blackburst signal.

The suspension of a station's transmission upon termination of a collision causes the hub to no longer transmit the jam signal and provides the opportunity for a subsequent transmission by that station to be received by another station(s). The suspension of a station's transmission at particular points in time during a collision causes the hub to reset the value of the station's $L_{ec}$ parameter to an initial value. As a result, that station should not be shut down by the hub because at least a portion of its transmission has collided with another station's transmission for a longer duration than the maximum allowed by the hub. In the event it has been so shut down, the station is caused to be reinstated into the network. Thus the hub communicates the station's subsequent transmission in the normal way.

Figure 4:
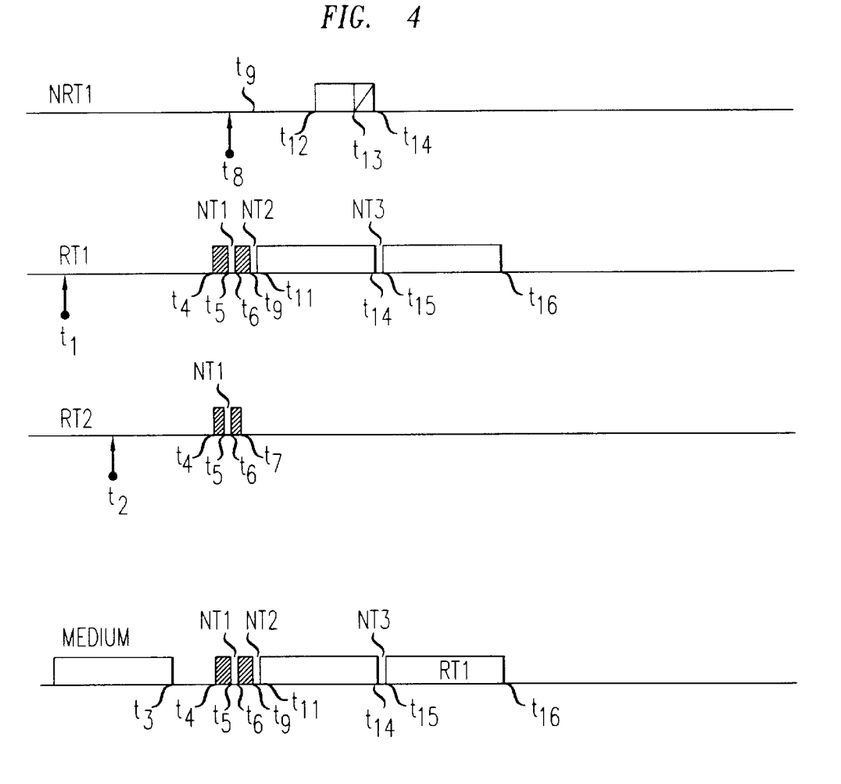
FIG. 4 shows an illustrative set of signals applied to the transmission medium of the network of FIG. 1 according to the principles of the present invention.

FIG. 4 (not drawn to scale) shows an illustrative set of signals applied to the medium by the various stations, as well as the overall composite signal appearing on the medium, according to the principles of the invention.

It is assumed that real-time stations RT1 and RT2 become ready to transmit packets at times $t_1$ and $t_2$, respectively. However, as can be seen from the composite signal on the medium, some other station is currently transmitting and hence stations RT1 and RT2 simply wait. The existing transmission terminates at time $t_3$, at which time real-time stations RT1 and RT2 perceive the medium to be idle. The two stations begin packet transmission at time $t_4$ which is $t_{ifs}$ bit-times after time $t_3$. Upon observing, shortly after time $t_4$, that a collision has occurred, real-time stations RT1 and RT2 proceed to transmit their first signals, illustratively their blackburst signals. The hub, also detecting the collision, transmits a jam signal.

As the stations transmit their blackburst signals, the hub continues to update the values of the $L_{ec}$ parameter for each station. At time $t_5$, the stations observe that their parameter values are close to or at the maximum value allowed by the hub. To prevent violating this hub rule and being shut down by the hub, the stations, rather than continuing with the transmission of their blackbursts, insert time notch NT1 (the duration of which is described in more detail below) during which the medium is idle. Specifically, each station effectuates time notch NT1 by stopping its blackburst transmission and setting a timer. The termination of its blackburst transmission causes hub 11 to reset its value of the $L_{ec}$ parameter. Upon expiry of the timer at time $t_6$, RT1 and RT2 recommence transmission of their blackburst signals.

Since RT1 was waiting longer, its blackburst signal is longer than that of RT2. RT2 continues its blackburst transmission until time $t_7$ at which time RT2 enters a waiting mode. At that point, because RT2 is no longer involved in a collision, the hub resets the value of RT2's $L_{ec}$ parameter. At time $t_9$, RT1 detects that the medium is now free of collisions and that it alone is transmitting a blackburst signal. Rather than continuing with the transmission of its packet, RT1 inserts time notch NT2 (the duration of which is described in more detail below) by terminating its blackburst and, following a predetermined duration of time, commencing transmission of a second signal, illustratively a data packet. The termination of RT1's blackburst transmission causes hub 11 to enter a collision-free state and to reset the value of the $L_{ec}$ parameter of RT1.

If nothing more were done, upon detecting time notches NT1 and NT2 during which the medium is idle, another real-time or non-real-time station that has a signal which the station is ready to transmit would take steps to access the medium. Conventionally this is done by immediately setting a timer, and, upon expiry of that timer $t_{ifs}$ bit-times later, transmitting the signal. This transmission, however, would collide with the transmission of the station(s) effectuating the time notch(es). In particular, with respect to time notch NT2, this transmission would collide with the second signal transmission of the real-time station that won the blackburst contention, i.e., the packet transmission that began at time $t_{11}$.

The occurrence of this collision gives rise to several problems. First, the hub will once again transmit a jam signal and not communicate any subsequent packet transmission from the winning station to other station(s). Second, the winning station's involvement in a second collision immediately subsequent to the prior collision causes the hub to increase the winning station's value of another parameter that the hub monitors. Specifically, the hub keeps track of the number of consecutive collisions in which a station is involved, this parameter being referred to herein as $N_{cc}$. As with the $L_{ec}$ parameter, if the value of this parameter for any station reaches or exceeds its maximum value allowed by the hub, the hub shuts down the offending station. The occurrence of the second collision causes the hub to increase the winning station's value of the $N_{cc}$ parameter. In a heavily loaded network in which collisions are more likely to occur, the winning station's value of this parameter may reach the maximum value allowed by the hub.

Such a second collision may not always occur because real-time stations operating under the blackburst scheme are preferably provided with filters recommended under Ethernet protocol that cause them to regard the medium as idle only if the medium is idle for a predetermined filter time interval $t_{ftr}$. Time interval $t_{ftr}$ is typically of some non-zero duration between 0 and $\frac{2}{3}$ of time interval $t_{ifs}$. That is, upon the medium becoming idle, a station having a filter transmits a then ready-to-transmit signal over the medium only if the medium remains idle for at least filter time interval $t_{ftr}$. In preferred embodiments, the duration of a time notch (e.g., NT1 and NT2) is not greater than that filter time interval $t_{ftr}$—meaning that the station that effectuates the time notch commences transmission within $t_{ftr}$ and thus the medium is not idle for the entire filter time interval. As a result, a competing station having such a filter "ignores" the time notch and does not commence a transmission, thereby ensuring that no further blackburst contentions will occur.

Non-real-time stations may also follow this recommendation. However, since having such a filter is not mandatory, there remains the possibility of a collision between the transmission of the station effectuating the time notch and that of a non-real-time station. If such a collision occurs between a non-real-time station and a station transmitting its blackburst, the non-real-time station will enter backoff mode and the blackburst contention between the real-time stations continues as described above. If, for example, the collision occurs between a non-real-time station's transmission and the packet transmission of a winning station after the time notch (e.g., time notch NT2), the hub will not communicate the winning station's packet and may possibly shut down the winning station, as described above.

According to as aspect of the present invention, if a winning station detects such a collision with a filter-free station, an additional time notch, time notch NT3, is provided. In particular, the signal transmitted by the winning station after time notch NT2 is at least of such a duration as to insure that a competing non-real-time station has stopped transmission of its jam signal and, according to standard protocol, has entered back-off mode. If no collision with a competing non-real-time station is detected, the winning station continues on to transmit its data packet. On the other hand, if a collision is detected, time notch NT3 of a predetermined non-zero duration of time (described hereinbelow in detail) is provided. Time notch NT3 is effectuated by the winning station stopping transmission upon detecting the termination of the competing station's jam transmission and commencing transmission—e.g., of a packet—after that predetermined non-zero duration of time. Time notch NT3 provides the opportunity for a successful subsequent transmission and receipt of the winning station's data packet by other station(s) and for the winning station's $L_{ec}$ parameter value to be reset. Moreover, assuming no further collisions, the value of the winning station's $N_{cc}$ parameter will be reset upon the successful subsequent transmission of its packet.

The implementation of time notch NT3 is illustrated in FIG. 4. Filter-equipped real-time station RT2 has been in a waiting mode since time $t_7$. Since the duration of NT2 is not greater than filter time interval $t_{ftr}$—meaning that RT1 commences transmission and the medium becomes busy within filter time interval $t_{ftr}$—RT2 does not interpret the lack of any signal on the medium in the duration from $t_9$ to $t_{11}$ as an indication to transmit after a time interval of $t_{ifs}$ bit-times. Hence RT2 does not commence transmission but rather continues to wait for the medium to be idle for longer than $t_{ftr}$, as described above.

Filter-free non-real-time station, NRT1, becomes ready to transmit at time $t_8$. However, RT1 is currently transmitting and NRT1 therefore waits for the medium to be idle. Upon observing time notch NT1 at time $t_9$, NRT1 waits the prescribed $t_{ifs}$ bit-times and then commences packet transmission at time $t_{12}$. NRT1's packet transmission collides with RT1's transmission whereupon NRT1, upon detecting the collision at time $t_{13}$, transmits a jam signal and enters back-off mode at time $t_{14}$.

Meanwhile, the collision between the transmission of real-time station RT1 and that of non-real-time station NRT1 causes the hub to transmit a jam signal and RT1's value of its $N_{cc}$ parameter to be increased. If RT1's $N_{cc}$ parameter value is now equal to or exceeds the maximum parameter value allowed by the hub, the hub shuts down RT1.

RT1, upon detecting the collision with NRT1, causes the occurrence of time notch NT3 during which the medium is again idle. Specifically, RT1 effectuates time notch NT3 by stopping its current transmission at time $t_{14}$ when NRT1 has completed the transmission of its jam signal, and setting a timer. The termination of its transmission results in the resetting of its value of the $L_{ec}$ parameter. Upon expiry of the timer at time $t_{15}$, RT1 commences transmission of a third signal, illustratively a data packet. Upon RT1 successfully completing its packet transmission at time $t_{16}$ without any further collisions, RT1's value of the $N_{cc}$ parameter is reset. For the most part, in a network that is generally well-behaved and not over-loaded, the value of a station's $N_{cc}$ parameter will rarely exceed the maximum value allowed by the hub.

Time notch NT3, as was the case with time notches NT1 and NT2, potentially allows for a filter-less station that is ready to transmit to detect the medium as being idle and to take steps to transmit, causing yet another collision. The possibility of a collision after time notch NT3—at least for stations having a filter—may be eliminated, as it was for time notches NT1 and NT2, by providing for the duration of time notch NT3 to be less than or equal to filter time interval $t_{fltr}$. To lessen the likelihood that a competing filter-free station that just transmitted its jam signal detects time notch NT3 and subsequently commences a transmission, the duration of time notch NT3 is preferably such that the medium will most likely be busy when the competing station, after completing transmission of its jam signal, once again checks to determine if the medium is idle. This criterion for the duration of time notch NT3 may be met if, for example, the duration of time notch NT3 is not greater than what is referred to herein as the "setup time."

In particular, after a station terminates a transmission, there is a certain amount of time that must pass before that station can once again transmit. This "setup time" includes time required for the hub to prepare to receive a new transmission from that station, e.g., time for the hub to restore ports and time for the hub to synchronize to a new transmission. Although in preferred embodiments the duration of time notch NT3 is no greater than the setup time, extending the duration past the setup time does not necessarily result in, but increases the possibility of, a subsequent collision. Moreover, for reasons such as implementational ease, all time notches are preferably of equal durations.

It is possible, however, that time notch NT3 may have to be followed by yet another time notch (and perhaps successive time notches) if the competing station detects time notch NT3 (and any successive time notches) and subsequently transmits, although the likelihood of this occurring decreases with each successive time notch.

As noted earlier, the signal, illustratively a data packet, transmitted by the winning station after time notch NT2 is of at least such a duration as to ensure that a competing non-real-time station has stopped transmission of its jam signal and, according to standard protocol, has entered back-off mode. This constraint should be satisfied by the conventional preamble that typically begins a transmission by a real-time station, the duration of which is sufficient to ensure that a colliding non-real-time station has stopped transmission of its jam signal and entered back-off mode. However, as explained below, the length of the preamble that begins the signal transmitted by a winning station after NT2 may be extended beyond that of a conventional preamble.

Figure 5:
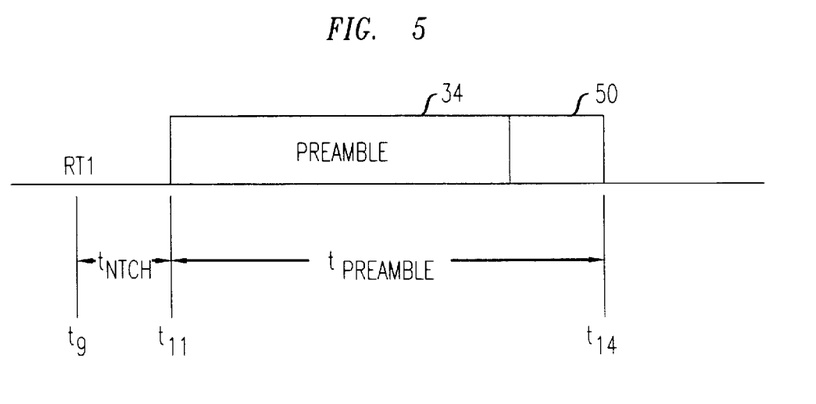
FIG. 5 shows a time sequence diagram useful in understanding aspects of the invention.

FIG. 5 (not drawn to scale) shows further details of the signals generated by RT1 as shown in FIG. 4 during the time period between $t_9$ (the beginning of time notch NT2) and $t_{14}$ (when RT1 stops transmission). In particular, time notch NT2 starts at $t_9$ and continues for a duration denoted by $t_{NTCH}$. Time notch NT2 is followed by RT1's transmission of a second signal, illustratively a packet beginning with a preamble. The length of the conventional preamble is $2\tau+j$, the sum of (a) the round-trip propagation delay on the medium, $2\tau$, and (b) the duration of the conventional Ethernet jam signal, j. To allow for a competing station to detect the notch, wait for a time interval of $t_{ifs}$, begin transmitting, and complete its jam transmission upon detecting a collision, the sum of the durations of the time notch, $t_{NTCH}$, and of the preamble, $t_{PREAMBLE}$, must be greater than or equal to the sum $(2\tau+j+t_{ifs})$. This requires the quantity $t_{PREAMBLE}$ to be greater than or equal to the sum of $(2\tau+j+t_{ifs}-t_{NTCH})$. Thus in preferred embodiments the preamble of the signal transmitted by the winning station after time notch NT2 is extended by extension 50 beyond $2\tau+j$ bits, for example, by $t_{ifs}$ bits.

The foregoing is to be understood as being exemplary and not restrictive. It will be appreciated that those skilled in the art will be able to devise various arrangements which, although not explicitly shown or described herein, embody the principles of the invention and thus are within its spirit and scope. All examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. For example, although the present invention was described in the context wherein the first signal transmitted by the winning station was its blackburst signal, the first signal may be any signal whose transmission causes the hub not to communicate the signal to other station(s) or any signal that has the potential of causing the transmitting station to be isolated from the network and subsequently reinstated upon termination of that first signal transmission. As another example, although in the embodiment described above, the filter-free stations were non-real-time stations, the principles of the invention equally apply to any filter-free station that exists or may exist in the future.

Moreover, all statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, (a) a combination of circuit elements which performs that function or (b) software in any form (including, therefore, firmware, microcode or the like) combined with appropriate circuitry for executing that software to perform the function. The invention as defined by such claims resides in the fact that the functionalities provided by the various recited means are combined and brought together in the manner called for in the claims. Applicants thus regard any means which can provide those functionalities as equivalent to those shown herein.

We claim:

1. A real-time communication station (RT Station) for use with a contention-based network having a plurality of said RT Stations and a communications medium, comprising:

said RT Station adapted to contend for access to said medium upon detection of a collision on said medium by transmitting a blackburst signal for a duration that is a function of at least a desired level of priority access to said medium as compared to others of said plurality of said RT Stations; and said RT Station further adapted to cease the transmission of said blackburst signal upon detecting said blackburst signal is the only signal being transmitted over said medium, and commence transmitting desired real-time signals upon elapse of a predetermined first non-zero duration of time after the end of the transmission of said blackburst signal.

2. The RT Station as recited in claim 1 wherein said RT Station is further adapted to enter a waiting mode upon completion of the transmission of said blackburst signal if another signal is present on said medium.

3. The RT Station as recited in claim 2 wherein said waiting mode includes said RT Station waiting for said medium to become idle.

4. The RT Station as recited in claim 3 wherein said RT Station, upon detecting said medium becoming idle, transmits a ready-to-transmit signal over said medium only if said medium thereafter remains idle for at least a predetermined filter time interval, and wherein said first predetermined non-zero time period is less than or equal to said filter time interval.

5. The RT Station as recited in claim 1 wherein said blackburst signal having a fixed length preamble and an integral number of black slots.

6. The RT Station as recited in claim 5 wherein said preamble has a duration equal to the sum of a round-trip propagation delay on said medium and a duration of a conventional jam signal for said medium; wherein each of said black slots have a duration equal to said round trip propagation delay on said medium; and said integral number of black slots determined by a time said RT Station has been waiting to transmit divided by a time to transmit a desired data packet having a given length upon gaining access to said medium, and rounded down to the next integer value.

7. The RT Station as recited in claim 1 wherein said medium employs a protocol and said blackburst signal is desired signal that does not match any predefined signal defined by said protocol.

8. The RT Station as recited in claim 1 wherein said contention-based network further having a plurality of non-real-time communication stations (NRT Stations); said RT Station further adapted to cease transmission of said desired real-time signals for a predetermined second non-zero duration of time upon detection of a conventional jam signal from one of said NRT Stations during said transmission of said desired real-time signals and then recommence said transmission of said desired real-time signals.

9. The RT Station as recited in claim 8 wherein said predetermined first non-zero duration of time and said predetermined second duration of time are substantially equal.

10. The RT Station as recited in claim 1 wherein said medium is selected from the group consisting of:
   a bus configuration,
   a star configuration, and
   a wireless configuration.

11. The RT Station as recited in claim 1 wherein said medium employs Ethernet protocol.

12. A method of operating a real-time communication station (RT Station) within a contention-based network having a plurality of said RT Stations and a communications medium, comprising:
   contending for access to said medium upon detection of a collision on said medium by transmitting a blackburst signal for a duration that is a function of at least a desired level of priority access to said medium as compared to others of said plurality of said RT Stations; and ceasing the transmission of said blackburst signal upon said blackburst signal is the only signal being transmitted over said medium, and commencing transmission of desired real-time signals upon elapse of a predetermined first non-zero duration of time after the end of the transmission of said blackburst signal.

13. The method as recited in claim 12 further comprising entering a waiting mode upon completion of the transmission of said blackburst signal if another signal is present on said medium.

14. The method as recited in claim 13 wherein said entering said waiting mode includes waiting for said medium to become idle.

15. The method as recited in claim 14 wherein said entering said waiting mode further includes, upon detecting said medium becoming idle, transmitting a ready-to-transmit signal over said medium only if said medium thereafter remains idle for at least a predetermined filter time interval, and wherein said first predetermined non-zero time period is less than or equal to said filter time interval.

16. The method as recited in claim 12 wherein said blackburst signal comprising a fixed length preamble and an integral number of black slots.

17. The method as recited in claim 16 wherein said preamble has a duration equal to the sum of a round-trip propagation delay on said medium and a duration of a conventional jam signal for said medium; wherein each of said black slots have a duration equal to said round trip propagation delay on said medium; and said integral number of black slots determined by a time said RT Station has been waiting to transmit divided by a time to transmit a desired data packet having a given length upon gaining access to said medium, and rounded down to the next integer value.

18. The method as recited in claim 12 wherein said medium employs a protocol and said blackburst signal is desired signal that does not match any predefined signal defined by said protocol.

19. The method as recited in claim 12 wherein said contention-based network further having a plurality of non-real-time communication stations (NRT Stations); said method further comprising ceasing transmission of said desired real-time signals for a predetermined second non-zero duration of time upon detecting a conventional jam signal from one of said NRT Stations during said transmission of said desired real-time signals and then recommencing said transmission of said desired real-time signals.

20. The method as recited in claim 19 wherein said predetermined first non-zero duration of time and said predetermined second duration of time are substantially equal.

21. The method as recited in claim 12 wherein said medium is selected from the group consisting of:
   a bus configuration,
   a star configuration, and
   a wireless configuration.

22. The method as recited in claim 12 wherein said medium employs Ethernet protocol.

23. A contention-based communications network, comprising:
   a communications medium having a conventional hub, said hub enforcing at least one rule;
   real-time communication stations (RT Stations), wherein ones of said RT Stations are couplable to said hub;

at least one of said RT Stations contends for access to said medium upon detection of a collision on said medium by transmitting a blackburst signal for a duration that is a function of at least a desired level of priority access to said medium as compared to others of said RT Stations;

said at least one of said RT Stations ceases transmission of said blackburst signal for a predetermined first non-zero duration of time before said at least one of said RT Stations violates said at least one rule during said transmission of said blackburst signal and then recommences said transmission of said blackburst signal; and said at least one of said RT Stations ceases the transmission of said blackburst signal upon detecting said blackburst signal is the only signal being transmitted over said medium, and commences transmitting desired real-time signals upon elapse of a predetermined second non-zero duration of time after the end of the transmission of said blackburst signal.

24. The contention-based communications network as recited in claim 23 wherein said at least one of said RT Stations enters a waiting mode upon completion of the transmission of said blackburst signal if another signal is present on said medium.

25. The contention-based communications network as recited in claim 24 wherein said waiting mode includes said at least one of said RT Stations waiting for said medium to become idle.

26. The contention-based communications network as recited in claim 25 wherein said at least one of said RT Stations, upon detecting said medium becoming idle, transmits a ready-to-transmit signal over said medium only if said medium thereafter remains idle for at least a predetermined filter time interval, and wherein said second predetermined non-zero time period is less than or equal to said filter time interval.

27. The contention-based communications network as recited in claim 23 wherein said blackburst signal having a fixed length preamble and an integral number of black slots.

28. The contention-based communications network as recited in claim 27 wherein said preamble has a duration equal to the sum of a round-trip propagation delay on said medium and a duration of a conventional jam signal for said medium; wherein each of said black slots have a duration equal to said round trip propagation delay on said medium; and said integral number of black slots determined by a time said at least one of said RT Stations has been waiting to transmit divided by a time to transmit a desired data packet having a given length upon gaining access to said medium, and rounded down to the next integer value.

29. The contention-based communications network as recited in claim 23 wherein said medium employs a protocol and said blackburst signal is desired signal that does not match any predefined signal defined by said protocol.

30. The contention-based communications network as recited in claim 23 wherein said contention-based network further having non-real-time communication stations (NRT Stations); said at least one of said RT Stations ceases transmission of said desired real-time signals for a predetermined third non-zero duration of time upon detection of a conventional jam signal from one of said NRT Stations during said transmission of said desired real-time signals and then recommence said transmission of said desired real-time signals.

31. The contention-based communications network as recited in claim 30 wherein said predetermined first non-zero duration of time and said predetermined third duration of time are substantially equal.

32. The contention-based communications network as recited in claim 30 wherein at least said predetermined third duration of time is less than or substantially equal to a predetermined filter time interval, or less than or equal to a setup time of said hub.

33. The contention-based communications network as recited in claim 23 wherein said hub is a wireless access point to said medium and ones of said RT Stations employ wireless communications to access said medium through said hub.

34. The contention-based communications network as recited in claim 23 wherein said medium employs Ethernet protocol.

\* \* \* \* \*